United States Patent [19]

Sparlin et al.

[11] 4,034,811

[45] July 12, 1977

[54] METHOD FOR SEALING A PERMEABLE SUBTERRANEAN FORMATION

[75] Inventors: Derry D. Sparlin, Ponca City, Okla.; Robert E. Crumb, Fort Worth, Tex.

[73] Assignee: Continental Oil Company, Ponca City, Okla.

[21] Appl. No.: 633,764

[22] Filed: Nov. 20, 1975

[51] Int. Cl.$^2$ .................................. E21B 33/138
[52] U.S. Cl. ........................... 166/295; 166/294
[58] Field of Search ........... 166/295, 294, 285, 276

[56] References Cited

U.S. PATENT DOCUMENTS

| | | | |
|---|---|---|---|
| 2,236,836 | 4/1941 | Prutton | 166/295 X |
| 2,321,761 | 6/1943 | Mathis et al. | 166/295 |
| 2,796,934 | 6/1957 | Vogel | 166/295 |
| 2,827,121 | 3/1958 | Nowak | 166/295 X |
| 3,199,589 | 8/1965 | Boyd et al. | 166/295 |
| 3,199,590 | 8/1965 | Young | 166/295 |
| 3,437,145 | 4/1969 | Johnson et al. | 166/295 |
| 3,548,944 | 12/1970 | Hess | 166/295 |
| Re. 23,393 | 7/1951 | Kurtz, Jr. et al. | 166/295 |

OTHER PUBLICATIONS

Hess et al., Chemical Method for Formation Plugging, *Journal of Petroleum Technology*, May 1971, pp. 559–564.

*Primary Examiner*—Stephen J. Novosad
*Assistant Examiner*—George A. Suchfield
*Attorney, Agent, or Firm*—Bayless E. Rutherford, Jr.

[57] ABSTRACT

A method for sealing a permeable subterranean formation, particularly adjacent to a wellbore, is disclosed. Briefly, the method comprises;
 a. adding a liquid polymerizable material (e.g. furfuryl alcohol) to the wellbore at the site adjacent to the permeable subterranean formation,
 b. adding an acidic catalyst to the wellbore at the site defined in (a),
 c. allowing polymerization to occur both in the wellbore and in the adjacent subterranean formation, and
 d. removing the polymerized material from the wellbore.

6 Claims, 4 Drawing Figures

METHOD FOR SEALING A PERMEABLE SUBTERRANEAN FORMATION

FIELD OF THE INVENTION subterranean

The invention is in the field of methods of sealing permeable subterreanean formations.

GENERAL BACKGROUND

In the drilling and production of oil from subterranean formations water zones are often encountered. Control of these water zones is required in order that the drilling and production may proceed.

Plastics have been used for many years as a means of controlling water zones. Plastics have many advantages for this use. One advantage is that they can be used in a low viscosity form which is capable of completely permeating the open pores of the formation. Another advantage is that they can be reacted in a manner to form a solid, infusible mass having excellent strength and plugging characteristics. Furfuryl alcohol plastics are examples of this type of plastic. The primary disadvantage of this type of plastic is that the polymerization is effected by a catalyst system. Difficulties are encountered in catalyzing the plastic so that it is most effective. One method of catalyzing the polymerizable materials is to inject the catalyst system as a separate fluid after the polymerizable material has been injected. This method has the disadvantage that the catalyst tends to displace the plastic away from the wellbore, thereby reopening some of the flow passages. Another method of catalyzing the ploymerizable material is to add a delayed acting catalyst prior to pumping the polymerizable material into the wellbore. This method has the disadvantage that often times polymerization occurs before the polymerization mass has been injected into the formation, thereby causing insufficient sealing of the formation.

My invention overcomes the disadvantages associated with the methods described in the foregoing.

PRIOR ART

From a search of the prior art, the most pertinent references appear to be the following:

U.S. Pat. No. 3,548,944 teaches a method for sealing earth formations which uses furfuryl alcohol and aluminum chloride or hydrogen chloride as the catalyst. The patent teaches alternately injecting the alcohol and catalyst into the formation. The patent further teaches injecting an inert liquid, such as diesel oil, after injection of one material and prior to the injection of the other.

U.S. Pat. No. 3,393,739 teaches a method of permeably consolidating loose sands, which method uses furfuryl alcohol and gaseous HCL. The patent specifically teaches that the consolidated sands are permeable. This feature is obtained through the use of either an inert gas or an inert flushing diluent.

U.S. Pat. No. 2,796,934 teaches selective plugging of subterranean formations by the use of a "plugging" composition. The plugging composition contains furfuryl alcohol, acidic material and other components. The patent teaches that usually the plugging composition is added to the tubing and is forced into the disired site to be plugged by use of drilling mud or other means. This patent does not teach separately adding the plugging material and catalyst to the site to be plugged.

U.S. Pat. No. 3,850,249 teaches a method of treating a permeable formation wherein the method uses an acid-settable liquid and a buffered or delayed acting catalyst.

The invention of the present application distinguishes over the teachings of the cited references in the following ways. The process does not require an inert liquid as taught by U.S. Pat. No. 3,548,944. U.S. Pat. No. 3,393,739 teaches that consolidated sands are permeable. U.S. Pat. No. 3,850,249 uses a delayed acting catalyst.

BRIEF SUMMARY OF THE INVENTION

Broadly stated, the present invention is directed to a method for sealing a permeable subterranean formation adjacent to a wellbore, wherein the method comprises:
a. adding a liquid ploymerizable material to the wellbore at the site adjacent to the permeable subterranean formation,
b. adding an acidic catalyst to the wellbore at the site defined in (a),
c. allowing polymerization to occur both in the wellbore and in the adjacent subterranean formation, and
d. removing the polymerizable material from the wellbore.

In a narrower aspect, the present invention is directed to a method for sealing a permeable subterranean formation adjacent to a wellbore, wherein the method comprises:
a. adding sand to a slotted liner within a wellbore to the lower level of the area to be treated,
b. adding gravel or similar material to the annulur space between the slotted liner and the underreamed wellbore,
c. adding a liquid ploymerizable material to the slotted liner at a site adjacent to the permeable subterranean formation,
d. adding an acidic catalyst to the liquid ploymerizable material at the site defined in step (c),
allowing polymerization to occur in the wellbore, in the gravel-filled annulus, and in the adjacent subterranean formation, and
removing the polymerized material and the sand from the slotted liner.

DESCRIPTION OF THE DRAWINGS

The description of the drawings shows a preferred embodiment of the invention.

Figure 1:
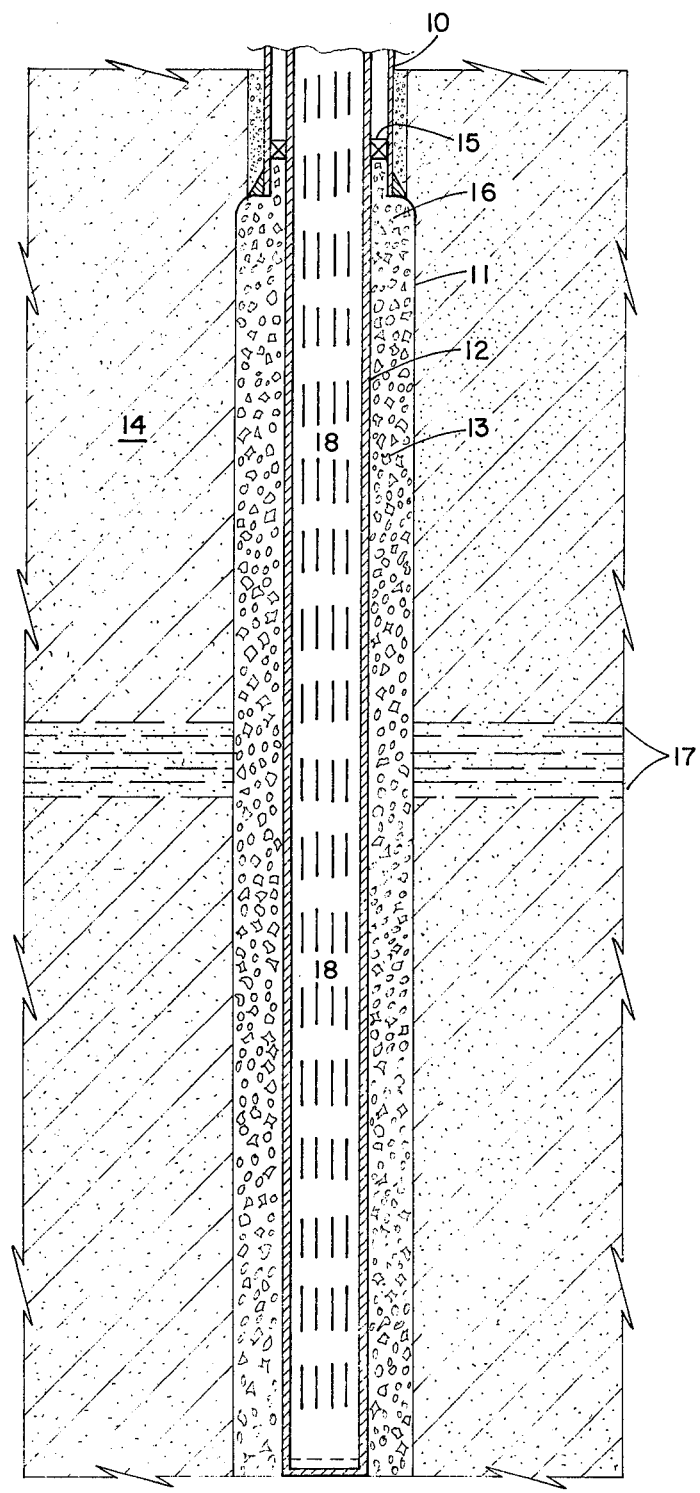
FIG. 1 is a sectional view of a typical wellbore prior to beginning the method described herein.

Referring now to FIG. 1, a well is shown having a 7 ½ inch casing 10 set at 3,000 feet. The wellbore 11 is underreamed to 12 inches diameter from 3,000 to 3,500 feet. A 5 inches slotted liner 12 inside the casing 10 and wellbore 11 extends to the 3,500 feet level. Gravel 13 is packed between the slotted liner 12 and the native formation sand 14. A packer 15 seals the upper end of the annulus 16 between liner 12 and wellbore 11. A low permeability shaley sand 17 exists between 3,200 and 3,230 foot depths.

Figure 2:
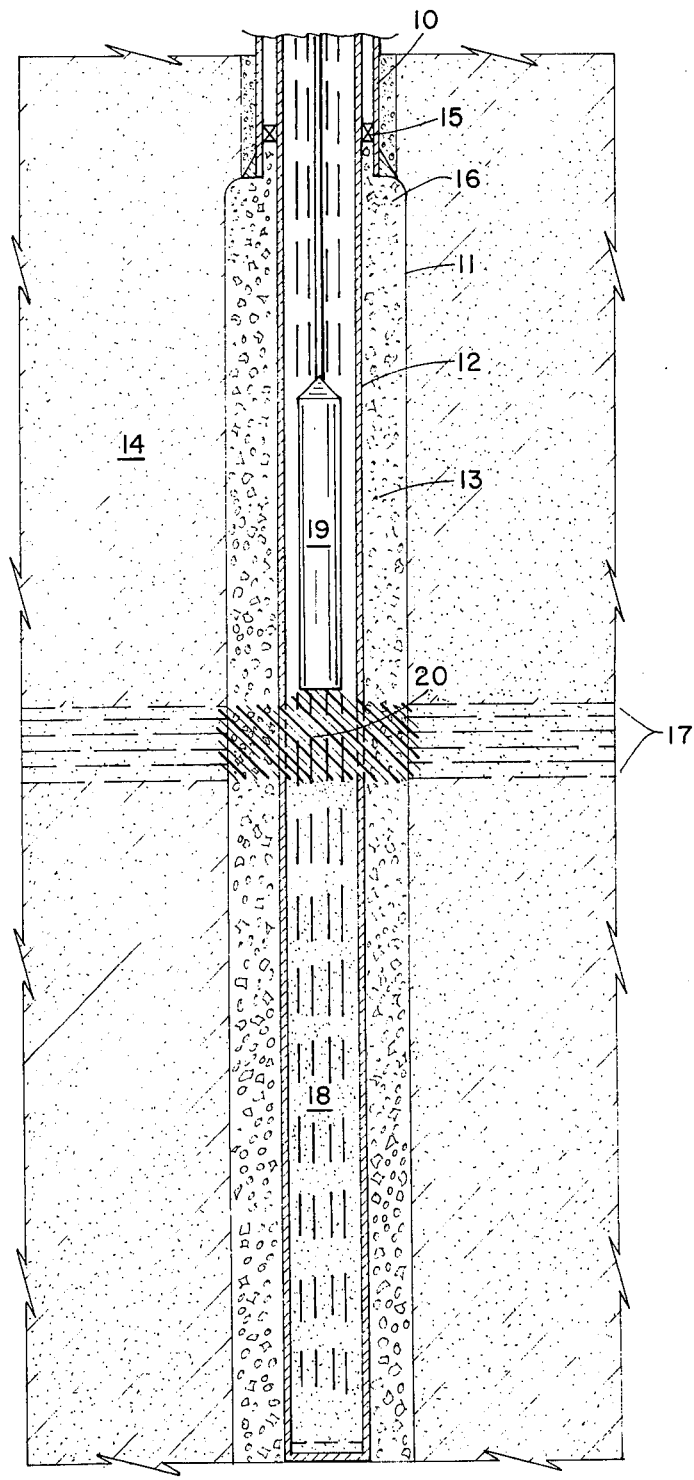
FIG. 2 is a sectional view of the wellbore at an intermediate stage in the method.

Referring to FIG. 2, fine sand or gravel 18 is pumped into the wellbore to fill the slotted liner 12 to the 3,230 foot level. A dump bailer 19 is used to place two barrels of furfuryl alcohol 20 into the liner 12 at the 3,200 foot level. The alcohol 20 is allowed to soak into the gravel filled annulus 16.

Figure 3:
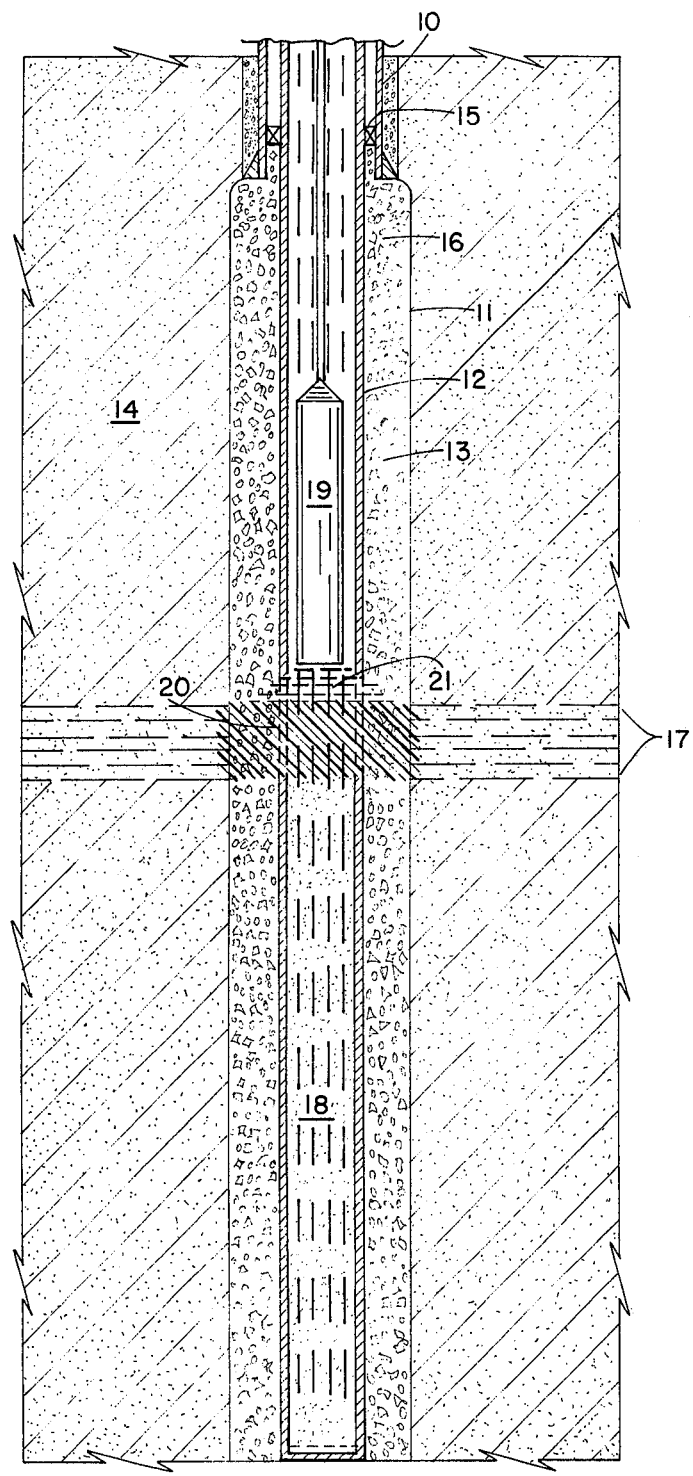
FIG. 3 is a sectional view of the wellbore at a further intermediate stage in the method.

Referring to FIG. 3, using a dump bailer 19 hypophosphorous acid 21 is then placed on top of the furfuryl alcohol 20. The dump bailer 19 is then pulled up the hole a short distance for approximately 30 minutes. The hypophosphorous acid polymerizes the furfuryl alcohol thereby forming a hardened polymer. After about 30 minutes, the dump bailer 19 is then lowered to "tag" the top of the hardened furfuryl alcohol (or polymer). If the level of the hardened alcohol is lower than 3,200 feet the procedure is repeated.

Figure 4:
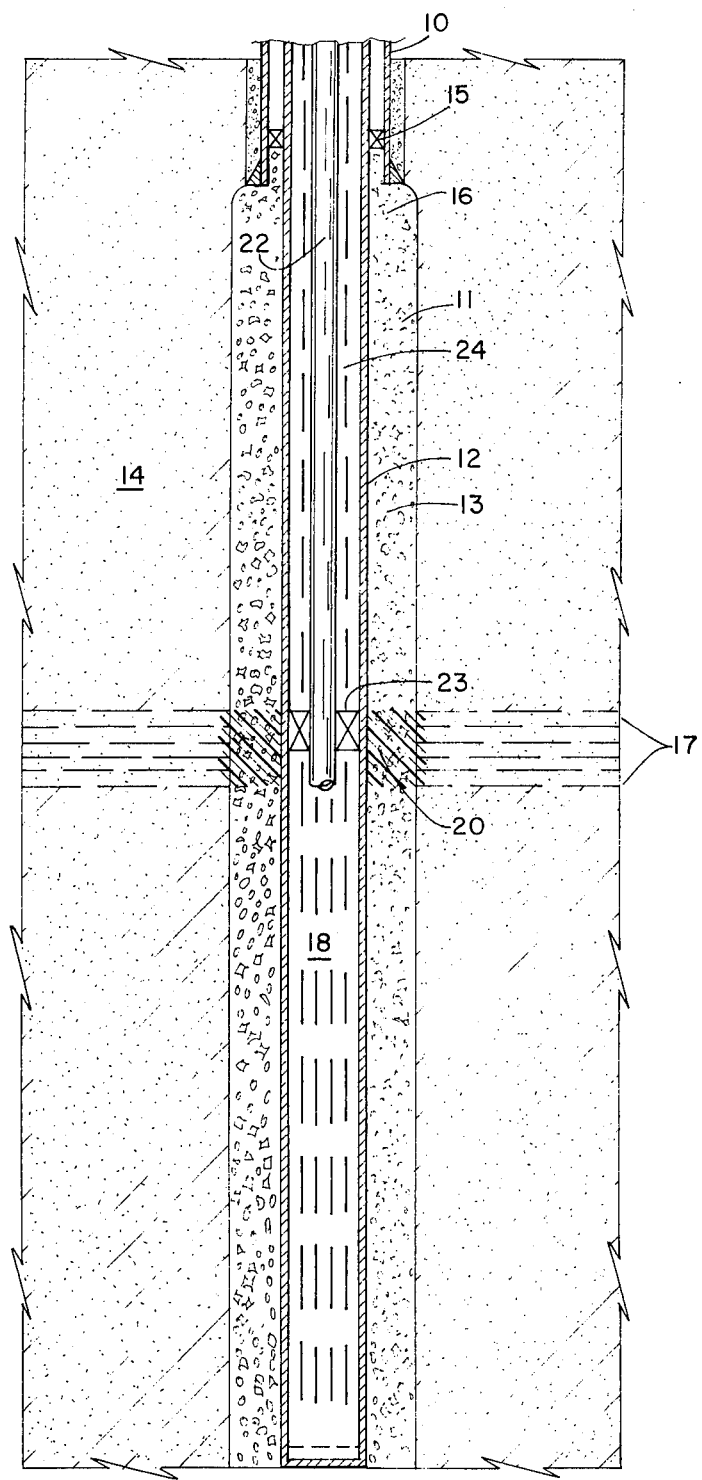
FIG. 4 is a sectional view of the wellbore after the method has been completed.

FIG. 4 shows the wellbore after the hardened furfuryl alcohol (or polymer) 20 and sand fill 18 have been removed from inside the slotted liner 12. A tubing 22 and packer 23 are then placed in the well so that the packer 23 will seal the annular space 24 between the slotted liner 12 and the tubing 22 at a point within the treated interval. Production from an injection into the well is thereby isolated in the upper zone above the packer 23 and the lower zone below the packer 23.

While a dump bailer has been shown as the means of placing the furfuryl alcohol and catalyst at the desired location, other means are known to those skilled in the art.

MATERIALS USED

While furfuryl alcohol is the preferred material, other materials can be used to form a hard resin downhole. Examples of other suitable acid-setting polymerizable materials include methyl vinyl ketone, vinyl ethers, acrolein, butadiene, styrene, N-vinyl pyrrolidone, and mixtures of the foregoing; acid-settable mixtures such as urea-formaldehyde, phenol-formaldehyde, cresol-formaldehyde, melamine- formaldehyde, furfuryl alcohol-formaldehyde, furfuryl alcohol- furfuryl-aldehyde, and the like mixtures, as known in the art; isoprene, and other acid-polymerizable polyolefinic hydrocarbons; and especially acid-polymerizable organic liquids which contain at least about 20 weight percent of furfuryl alcohol.

Suitable catalysts include mineral acids such as sulfuric acid, hydrochloric acid, and the various phosphoric acids. Hypophosphorous acid is preferred.

The ratio of catalyst to polymerizable material can be readily determined by those skilled in the art. From the following discussion it will be apparent that only a small amount of catalyst is required.

ADVANTAGES OF OUR INVENTION

Our method has the advantage that a solid impermeable polymer is formed immediately adjacent to the liner thereby forming a fully effective barrier. While some polymer is formed inside the liner this can easily be removed, e. g. by reaming the liner.

Our method has the further advantage that only a small amount of acid catalyst is required to initiate the polymerization.

Once initiated the polymerization is auto-catalyzed by the action of the levulinic acid formed initially. Thus, the polymerization reaction continues until all of the furfuryl alcohol is polymerized.

FURTHER ILLUSTRATIONS

The following laboratory test is provided in order to illustrate still further our invention. It demonstrates the propagation of the polymerization reaction through a sand body when catalyst is added only to the polymerizable material inside the wellbore.

A slotted tube approximately 2 ⅝ inches diameter was placed in the center of a 1-liter size steel beaker. Sand was then packed in around the slotted tube and diesel fuel was used to saturate the sand to simulate a hydrocarbon bearing formation. The slots were small enough to keep the sand outside of the tubing but allow diesel fuel to enter inside the tubing. Then 250 ml of furfuryl alcohol was poured into the inside of the slotted tubing where it distributed itself inside and outside of the slotted tubing by gravity. The beaker and contents were heated to 150° F to further simulate a natural subterranean formation. A volume of approximately 25 ml of a 15 percent solution of HCl was then poured into the inside of the slotted tubing. Reaction began quickly, resulting in a temperature of 220° F inside the tubing. The beaker and contents were then allowed to cool. Inspection showed that practically all of the sand had been fused into a solid impermeable mass bonded onto the slotted liner.

Thus, having described the invention in detail, it will be understood by those skilled in the art that certain variations and modifications may be made without departing from the spirit and scope of the invention as defined herein and in the appended claims.

We claim:
1. A method for sealing a permeable subterranean formation adjacent to a wellbore wherein the method comprises:
   a. adding furfuryl alcohol to the wellbore at a site adjacent to the permeable subterranean formation,
   b. adding an acidic catalyst, selected from the group consisting of hydrochloric acid, phosphoric acid, and hypophosphorous acid, to the furfuryl alcohol at the site referred to in step (a),
   c. allowing polymerization to occur both in the wellbore and in the adjacent subterranean formation, and
   d. removing the polymerized material from the wellbore.
2. A method for sealing a permeable subterranean formation adjacent to a wellbore wherein the method comprises:
   a. adding sand to a slotted liner within a wellbore to the lower level of the area to be treated,
   b. adding gravel or similar material to the annulur space between the slotted liner and the underreamed wellbore,
   c. adding a liquid polymerizable material to the slotted liner at a site adjacent to the permeable subterranean formation,
   d. adding an acidic catalyst to the liquid polymerizable material at the site defined in step (c),
   allowing polymerization to occur both in the wellbore and in the adjacent subterranean formation, and
   f. removing the polymerized material and the sand from the slotted liner.
3. The method of claim 2 wherein the liquid polymerizable material is furfuryl alcohol.
4. The method of claim 3 wherein the acidic catalyst is hydrochloric acid.
5. The method of claim 3 wherein the acidic catalyst is a phosphoric acid.
6. The method of claim 3 wherein the acidic catalyst is hypophosphorous acid.

* * * * *